(12) United States Patent
Hurst et al.

(10) Patent No.: US 9,080,927 B2
(45) Date of Patent: Jul. 14, 2015

(54) COMBINATION STATIC AND DYNAMIC PRESSURE TRANSDUCER EMPLOYING A MICRO-FILTER

(71) Applicants: Adam Hurst, New York, NY (US); Alexander A. Ned, Kinnelon, NJ (US); Joseph R. VanDeWeert, Maywood, NJ (US)

(72) Inventors: Adam Hurst, New York, NY (US); Alexander A. Ned, Kinnelon, NJ (US); Joseph R. VanDeWeert, Maywood, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 0 days.

(21) Appl. No.: 14/069,584

(22) Filed: Nov. 1, 2013

(65) Prior Publication Data

US 2014/0060198 A1    Mar. 6, 2014

Related U.S. Application Data

(63) Continuation of application No. 13/242,139, filed on Sep. 23, 2011, now Pat. No. 8,616,064, which is a continuation-in-part of application No. 13/161,594, filed on Jun. 16, 2011, now Pat. No. 8,240,216, which (Continued)

(51) Int. Cl.
| | |
|---|---|
| *G01L 11/00* | (2006.01) |
| *G01L 7/00* | (2006.01) |
| *G01M 15/14* | (2006.01) |
| *G01L 19/06* | (2006.01) |
| *G01L 13/00* | (2006.01) |

(52) U.S. Cl.
CPC .............. *G01M 15/14* (2013.01); *G01L 13/00* (2013.01); *G01L 19/0609* (2013.01); *G01L 19/0627* (2013.01); *G01L 19/0681* (2013.01)

(58) Field of Classification Search
None
See application file for complete search history.

(56) References Cited

U.S. PATENT DOCUMENTS

| | | | |
|---|---|---|---|
| 4,994,781 | A | 2/1991 | Sahagen |
| 5,587,601 | A | 12/1996 | Kurtz |
| 5,770,806 | A | 6/1998 | Hiismaki |
| 5,939,639 | A | 8/1999 | Lethbridge |

(Continued)

FOREIGN PATENT DOCUMENTS

GB    2037993    7/1980

OTHER PUBLICATIONS

International Search Report and Written Opinion for related Application No. PCT/US2011/027598 dated Aug. 29, 2011.

*Primary Examiner* — Andre Allen
(74) *Attorney, Agent, or Firm* — Troutman Sanders LLP; James E. Schutz; Mark Lehi Jones

(57) ABSTRACT

A pressure transducer assembly that uses static pressure compensation to capture low-level dynamic pressures in high temperature environments. In one embodiment, a method comprises receiving, at a first tube, a pressure, wherein the pressure includes a static pressure component and a dynamic pressure component; receiving, at a micro-filter, the pressure; filtering, by the micro-filter, at least a portion of the dynamic pressure component of the pressure; outputting, from the micro-filter, a filtered pressure; receiving, at a first surface of a first sensing element, the pressure; receiving, at a second surface of the first sensing element, the filtered pressure; measuring, by the first sensing element, a difference between the pressure and the filtered pressure, wherein the difference is associated with the dynamic pressure component of the pressure; and outputting, from the first sensing element, a first pressure signal associated with the dynamic pressure component of the pressure.

20 Claims, 8 Drawing Sheets

Related U.S. Application Data is a continuation of application No. 12/719,789, filed on Mar. 8, 2010, now Pat. No. 7,975,552, which is a continuation-in-part of application No. 12/315,614, filed on Dec. 4, 2008, now abandoned, which is a continuation of application No. 11/409,139, filed on Apr. 21, 2006, now Pat. No. 7,484,415.

(56) References Cited

U.S. PATENT DOCUMENTS

| | | |
|---|---|---|
| 6,070,469 A | 6/2000 | Taniguchi et al. |
| 6,363,792 B1 | 4/2002 | Kurtz et al. |
| 6,612,178 B1 | 9/2003 | Kurtz et al. |
| 7,484,415 B2 | 2/2009 | Kurtz et al. |
| 7,975,552 B2 | 7/2011 | Kurtz et al. |
| 8,074,521 B2 * | 12/2011 | Kurtz et al. ............ 73/716 |
| 8,613,224 B2 * | 12/2013 | Kurtz et al. ............ 73/716 |
| 8,616,064 B2 * | 12/2013 | Hurst et al. ............ 73/702 |
| 2004/0069069 A1 | 4/2004 | Gysling et al. |
| 2005/0044958 A1 | 3/2005 | Chowdhury |
| 2007/0272032 A1 | 11/2007 | Adams et al. |
| 2008/0276712 A1 | 11/2008 | Kurtz et al. |
| 2009/0139339 A1 | 6/2009 | Kurtz et al. |
| 2010/0175482 A1 | 7/2010 | Kurtz et al. |
| 2010/0186514 A1 | 7/2010 | Teshigahara et al. |
| 2011/0107840 A1 | 5/2011 | Kurtz et al. |

\* cited by examiner

COMBINATION STATIC AND DYNAMIC PRESSURE TRANSDUCER EMPLOYING A MICRO-FILTER

CROSS-REFERENCE TO RELATED APPLICATIONS

This application is a Continuation application that claims priority under 35 U.S.C. §120 to U.S. patent application Ser. No. 13/242,139, filed Sep. 23, 2011, now U.S. Pat. No. 8,616,064, issued Dec. 21, 2013, the contents of which are incorporated by reference in their entirety as if fully set forth below.

TECHNICAL FIELD

This invention relates to pressure transducers and more particularly to a pressure transducer incorporating a micro-filter replacing the prior art infinite tube.

BACKGROUND

Aerodynamic engineers have long desired to measure high frequency flow and pressure disturbances in gas turbine engines and aircraft wings. The capability was made possible with extremely compact pressure transducers fabricated from micro-machined silicon. The frequencies of concern were for example, in the tens of thousands of kilohertz (kHz). As such, Kulite Semiconductor Products, Inc., the assignee herein, has developed many transducers which operate to measure such pressure disturbances in gas turbine engines and aircraft wings. Such devices are the subject matter of various patents that describe their operation and fabrication. See, for example, U.S. Pat. No. 6,612,178 entitled "Leadless Metal Media Protected Pressure Sensor" issued on Sep. 2, 2003 to A. D. Kurtz et al. and assigned to the assignee herein. See also, U.S. Pat. No. 6,363,792 entitled "Ultra High Temperature Transducer Structure" issued on Apr. 2, 2002 to A. D. Kurtz et al. and assigned to the assignee herein. In any event, as will be explained, there are certain situations where mounting of the transducer becomes extremely difficult.

For example, in order to determine the pressure and high frequency flow in gas turbines, a recessed pipe is attached to the combustion chamber that allows the hot gases within the chamber to cool before reaching the sensor. While the pipe does successfully cool the gases, it also reduces the bandwidth of the pressure measurement because of the generation of harmonic frequencies. Similar to blowing air over the top of an open bottle, the air inside the recessed pipe will be compressed by the air jet back out of the recess. In essence, the air inside the bottle acts as a spring. The oscillations of the air inside the recess results in a resonant frequency similar to that of an organ pipe. Such vibrations make measuring the pressure and flow of the gases within the combustion chamber of the gas turbine difficult. As will be explained, in the prior art, a long, curled tube (or "infinite tube") has been used to remove such resonances. However, such a solution requires many feet of tubing and very accurate coiling of the tube. Further difficulties associated with the prior art include the lack of access for mounting such transducers in a turbine case, as well as problems which involve discriminating against low and high frequencies.

An alternative mechanism that overcomes one or more of these problems is desirable.

BRIEF SUMMARY OF INVENTION

The various embodiments of the present invention provide a pressure transducer assembly for measuring low-level, dynamic pressures in high temperature environments. Exemplary embodiments of the pressure sensor assembly comprise an elongated tube having a first end, a second end, and a side surface, wherein the first end receives an incoming pressure. A first sensor may be mounted a first distance along the side surface from the first end of the first elongated tube and extending into the first elongated tube, wherein the first sensor measures the total pressure of the incoming pressure. A second sensor may be mounted at substantially the first distance along the side surface from the first end of the first elongated tube and extending into the first elongated tube, wherein the second sensor measures a dynamic pressure of the incoming pressure. The pressure sensor assembly may further comprise a micro-filter disposed proximate the second end of the first elongated tube, wherein the micro-filter dampens acoustic waves associated with the incoming pressure and allows the static pressure to pass through. Even further, the pressure sensor assembly may comprise second elongated tube that extends between a terminal end of the micro-filter and the second sensor, wherein the second elongated tube further dampens acoustic waves associated with the incoming pressure and allows the static pressure to pass through. Static pressure and dynamic pressure from the incoming pressure may be applied to a first side of the second sensor and the static pressure that passes through the micro-filter may be applied to a second side of the second sensor, such that static pressure is canceled out of the dynamic pressure measurement.

DETAILED DESCRIPTION OF PREFERRED EMBODIMENTS

Figure 1:
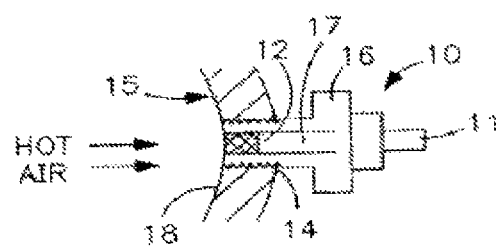
FIG. 1 depicts a prior art technique of mounting a pressure transducer to a turbine casing designated as a flush mount condition.

Referring to FIG. 1, there is shown a prior art technique depicting a typical installation which is employed in the aerodynamics industry. In FIG. 1, reference numeral 15 represents a gas turbine casing. The gas turbine casing is typically found in a gas turbine engine. The operation of such an engine is attendant with extremely high temperatures which are directed to the casings. There is shown a transducer 10 which is mounted on a housing 16. The housing 16 is threaded and essentially threads into a threaded aperture which is formed in the turbine casing 15. Located remote from the transducer 10 is a sensing diaphragm 12. The sensing diaphragm 12 as seen in FIG. 1 is responsive to the pressure created by the hot air gases associated with the turbine which therefore causes the diaphragm 12 to deflect and produces a pressure response from the transducer which is coupled thereto via the tube cavity 17. The cable 11 directs the output from the transducer 16 to various monitoring equipment as is well known. As indicated, FIG. 1 shows a typical installation with the transducer 10 installed on the gas turbine case 15. The close coupling of the transducer sensing diaphragm 12, which is flush mounted with the inner wall surface 18 of the turbine case, provides a wide bandwidth, typically on the order of direct current (DC) to twenty percent (20%) of the resonant frequency of the sensing diaphragm. The resonant frequency of the sensing diaphragm is typically in the hundreds of kilohertz (kHz) yielding a flat response to dynamic pressures from DC to greater than thirty kilohertz (30 kHz). The diaphragm 12 is flush with the inner wall 18 of the turbine casing. However, there are certain situations where the flush mount is not possible.

Figure 2:
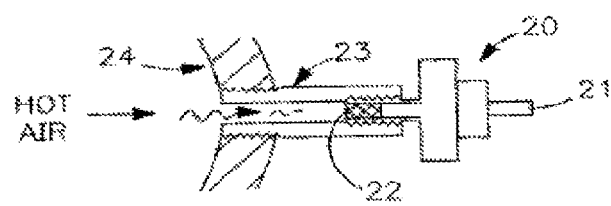
FIG. 2 depicts an alternate method of mounting a pressure transducer to a turbine casing using an elongated tube.

Referring to FIG. 2, there is shown a more typical installation where the transducer 20 must be recessed some distance away from the turbine case 24. The reasons for such a recess include lack of access, but most often this is due to the extremely high turbine gas temperature which can be as high as two thousand degrees Celsius (2,000° C.). These temperatures require use of the elongated tube 23. In modern aircraft engines the compressor air temperature can reach about seven hundred degrees Celsius (700° C.), and the combustor gas temperature can be as high as about two thousand degrees Celsius (2,000° C.). The latter temperature is beyond the capabilities of even the most advanced transducers. Thus, the measurement of pressure at these high temperatures involves a recessed installation with the transducer and pressure source separated by a pipe or tube 23 so that the transducer is located in a somewhat cooler ambient area. As seen in FIG. 2, the pipe 23 extends from the gas turbine case 24 and now accommodates the transducer 20, the cable 21 and the diaphragm 22. The diaphragm 22 is remote from the casing 24 (as compared to FIG. 1). An example of a transducer 20 is the high temperature miniature IS pressure transducer manufactured and sold by Kulite Semiconductor Products, Inc. as the XCEL-072 series. Such transducers are about 0.075 inches (0.075") in diameter. The pipe 23 while not shown to scale in FIG. 2 is essentially an organ pipe with a finite length. This reduces the measurement bandwidth due to organ pipe harmonic frequencies, defined as $f=c/4L$, where f is equal to the frequency, c is equal to the velocity of the hot air and L is the length of the pipe. As is known, the recess pipe reduces the measurement frequency based on pipe harmonic frequencies as defined by the above equation and high harmonics. For example, a one inch long organ pipe filled with air has a resonant frequency of about 3.3 kHz, representing an acoustic wave bouncing back and forth between the organ pipe ends. The usable frequency is even less, by about a factor of five (5), to about six hundred and sixty Hertz (660 Hz), which is too low for most gas turbine applications. To overcome this limitation, a technique known as infinite tube pressure transducer solves the organ pipe frequency limitation.

Figure 3:
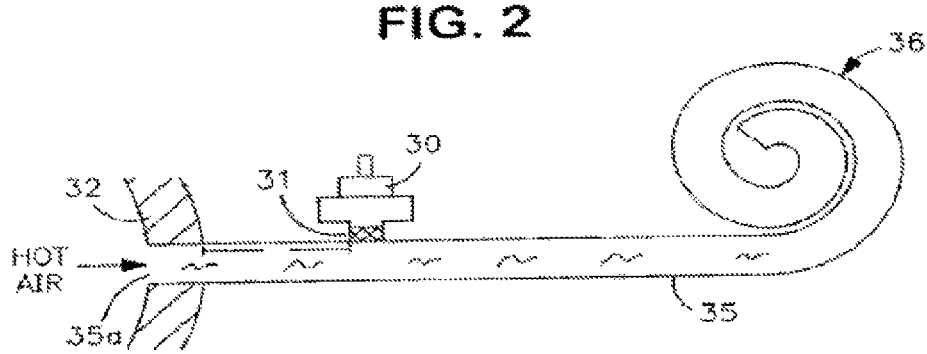
FIG. 3 depicts still another technique of mounting a pressure transducer to a turbine casing using a coiled tube or infinite tube array.

Referring to FIG. 3, a transducer 30 is installed on the side wall of the so called infinite tube 35. The transducer 30 is installed some distance D away from the hot gas inlet, typically a distance of about one to six inches, with longer distances if the gas temperature is higher. The tube 35 is coupled to the gas turbine case 32 via an aperture. The hot air enters the tube at inlet 35a and the tube has an end which essentially is coiled as indicated by reference numeral 36. The acoustic waves as generated from the source, enter the tube 35 and travel to the transducer location with some attenuation. Because there is basically no reflection off the far end, as the pressure waves are eliminated by viscous dissipation, the transducer measurement will not be contaminated with organ pipe harmonics and thus will measure static and dynamic pressure to higher frequencies than achievable in installations such as those depicted in FIG. 1 and FIG. 2. This arrangement allows the transducer to be positioned in a cooler location, therefore, allowing pressure measurements at very high gas temperatures. In situations where dynamic pressure at the transducer location is attenuated, calibration curves can be used to correct the measurement data. The infinite tube which typically can be thirty (30) to one thousand (1,000) feet long, is packaged into a cylindrical bundle as indicated by reference numeral 36 to the size of about two (2) to three (3) inches in diameter, and three (3) to five (5) inches in height. As one can ascertain, this cylindrical bundle is rather large, compared for example, to the dimensions of the transducer 30 associated with the deflection diaphragm 31. For example, a typical IS transducer as indicated above, is about 0.375 inches in length and has a diameter of about 0.075 inches. Thus, as one can ascertain, the infinite tube package is quite large compared to the size of the transducer. The infinite tube package is also cumbersome to handle in practice. For example, slight kinks in the tube cause undesirable acoustic reflections. Therefore, great care must be taken in coiling the tube into a cylindrical bundle. It is thus preferable to use small diameter tubes for ease of packing and low weight. However, better performance results if the sensing diaphragm is as close to the tube's inner wall as possible, thus avoiding sharp edges and cavities. The edges and cavities are sources of acoustic reflection. For this reason, larger diameter tubes or tubes of oval cross section are more desirable so that small diameter (e.g., 0.075 inch) transducers can be used. Practically, the infinite tube diameter is a compromise between these two constraints, and is typically about 0.040 to 0.125 inches in diameter. Thus, even with optimum packaging, typical infinite tube transducers are size and weight limited. They are prone to damage by shock and vibration typically found in gas turbine test environments. It is well known that instrumentation engineers prefer not to use these infinite tube transducers whenever an alternative method is available. Building on the same viscosity driven dissipation mechanism used in infinite tube transducers two applications, entitled "Low-Pass Filter Semiconductor Structures for Use in Transducers for Measuring Low Dynamic Pressures in the Presence of High Static Pressures" by A. D.

Kurtz et al. and assigned to the assignee herein, and "Improved Pressure Transducer for Measuring Low Dynamic Pressures in the Presence of High Static Pressures" also by A. D Kurtz and assigned to the assignee herein, describe infinite tube replacement transducers and essentially the characteristics and operation of such tubes in frequency responsive applications.

Figure 4:
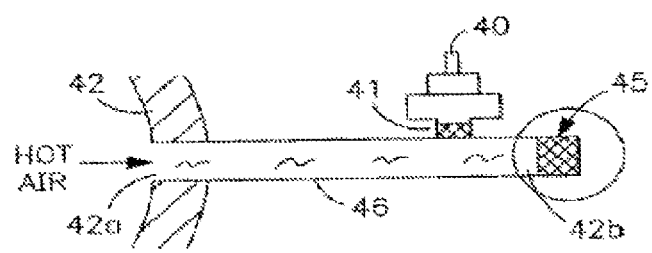
FIG. 4 depicts a pressure transducer mounted to a turbine casing employing the micro-filter according to an embodiment of the present invention.

Referring now to FIG. 4, there is shown schematically an apparatus according to an exemplary embodiment of the present invention which essentially eliminates the infinite tube bundle depicted in FIG. 3. According to an aspect of the present invention, a micro-filter 45 essentially mimics the effects and benefits associated with the infinite tube structure illustrated in FIG. 3. The micro-filter 45 operates to dampen or absorb acoustic waves impinging on it with limited or no reflection. One way of achieving a micro-filter is to use a wafer of silicon with micro-pores etched from the wafer. The micro-pores are small in diameter so as to maximize viscous damping effects. Another way of achieving a micro-filter is by making small glass tubes and then combining the tubes into a cylindrical bundle. Because the acoustic waves are likely to bounce off solid surfaces, the micro-filter surface facing the flow should be as small as possible and of course include pores or apertures in the surface. As shown in FIG. 4, a tube 46 is coupled to the turbine casing and allows hot air to enter the front opening 42a. The transducer 40 is remotely located from the turbine casing and is placed on the surface of the tube 46 with the sensing diaphragm 41. Following and terminating the infinite tube at the back opening 42b is the micro-filter 45. The micro-filter replaces the very long tube as indicated in FIG. 3, achieving substantial size and weight reductions. A number of unanticipated benefits are derived from this construction.

Figure 5:
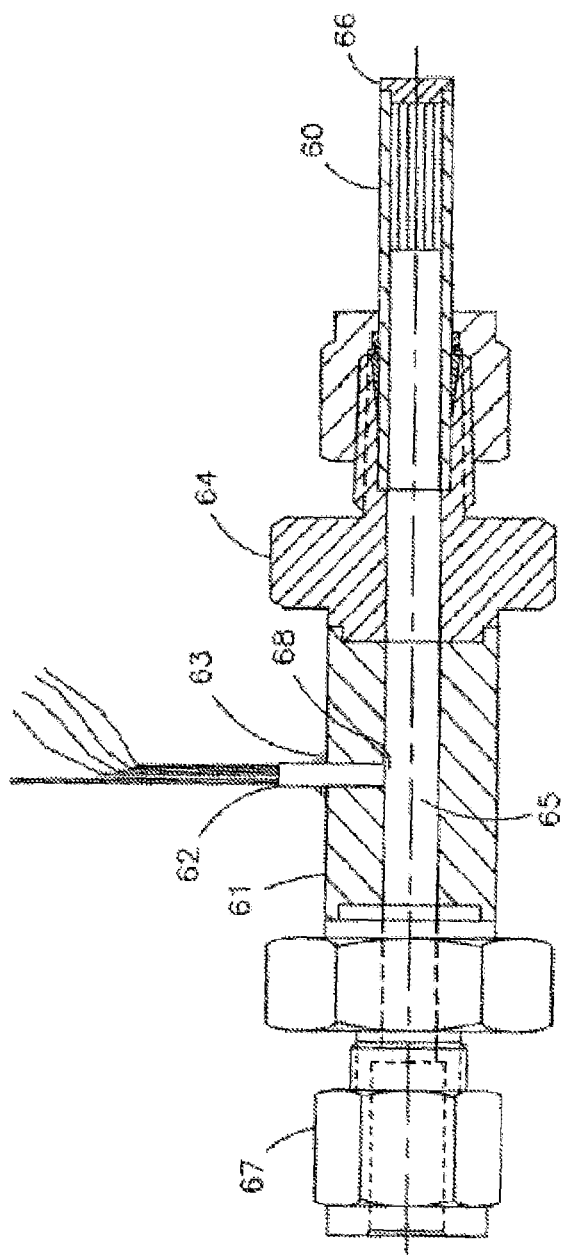
FIG. 5 shows a pressure transducer utilizing a micro-damper or filter according to an embodiment of the present invention.

Referring to FIG. 5, there is shown a cross-sectional view of a transducer assembly utilizing a micro-filter 60. The micro-filter 60 can be fabricated by a number of techniques, including, for example, use of a silicon wafer having suitable pores etched therein. In another embodiment, the micro-filter or damper can be a compilation of micro-glass tubes, preferably about 0.5 to 6 inches in length. One can use an additional porous silicon wafer to increase damping. A single glass tube array or a single porous silicon wafer can alternatively be used. Further, shown in FIG. 5 is a pressure transducer assembly with a housing 61. The housing 61 contains the pressure transducer 62 with the diaphragm end of the transducer 68 located within the cavity 65 of the housing assembly 61. The cavity 65 extends from one opened end to the other opened end, where the other opened end is terminated with the micro-filter 60 and has an end cap 66. A mounting arrangement indicated generally as reference numeral 67 is shown for mounting the entire unit to a suitable structure, and includes fitting screws and/or other well know connectors. Such mounting arrangement is well known and further description is omitted herein for brevity.

Figure 7:
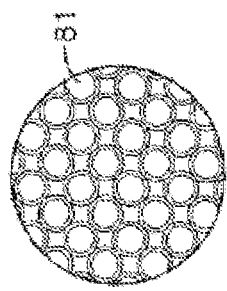
FIG. 7 shows an enlarged view of the array of pores or apertures in the micro-filter.
Figure 6:
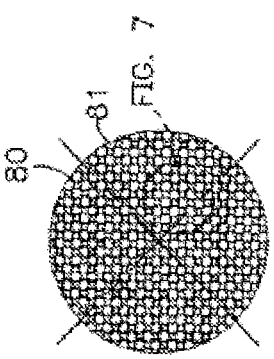
FIG. 6 shows a front view of a micro-filter according to an embodiment of the present invention.

Referring to FIG. 6, there is shown a cross-sectional view of the micro-filter or damper 60 depicted in FIG. 5. As one can ascertain there are a plurality of small apertures 81 which extend from one end of the damper 80 to the other end. FIG. 7 shows an enlarged view of the apertures in FIG. 6. As one will understand, the micro-filter 60 can be fabricated from silicon and one can etch apertures shown in FIG. 6 and FIG. 7 into the silicon by conventional etching techniques. The etching of silicon and formation of apertures in silicon is well known. The acoustic filter 60 is fabricated by the packing small diameter glass tubes which basically are stacked within an outer shell or housing depicted by reference numeral 80 of FIG. 6. The outer diameter of the glass tubes may vary between about 0.005 inches and 0.02 inches with the inner diameter varying between about 0.004 inches and 0.015 inches. The tubes are about 0.5 to six (6) inches in length. The variation of diameters is a function of the frequencies to be accommodated. Thus, the glass tube matrix array as shown in FIGS. 6 and 7 illustrate configuration(s) employed with the glass tubes abutting against one another. The glass tubes are conventionally joined together under heat and one then extrudes the bundle to produce the array. A wafer of silicon can be utilized with the apertures directed from a first to a second surface of the silicon, or both devices can be employed together.

The present invention has many advantages which are not accommodated by the prior art techniques. For example, the size and weight of the unit, in contrast to the unit of FIG. 3, are greatly reduced by at least one order of magnitude. The device shown in FIG. 5 is easier to handle and less susceptive to shock and vibration damage and represents a more viable device for wide spread use in gas turbine testing or laboratory research. The device further extends the high frequency pressure measurement capability in extremely high temperature and high vibration environments. Still further, larger diameter coupling tubes can be used without significant size and weight boundaries because the very long infinite tube is eliminated and a compact micro-filter (as for example, reference number 60 depicted in FIG. 5) is employed. The pressure transducer 62, for example, having a 0.075 inch diameter housing as seen in FIG. 5, is flush mounted to the tube 65 inside wall with little or no step cavity. This is depicted in FIG. 5 wherein the diaphragm portion 68 of the transducer 62 is flush with the inner wall of the internal tube cavity 65. The larger diameter reduces viscous damping as pressure waves travel to the transducer along the tube. Both factors lead to better pressure measurements, in terms of both accuracy as well as frequency range. The pressure measurements using such a technique will include both static and dynamic pressure when a piezoresistive pressure transducer is employed for transducer 62. Also, as new high temperature piezoresistive transducers are developed, the distance between the transducer and the hot gases can be reduced, thus allowing pressure measurements to be made with better accuracy and higher frequency.

While it is clear that the above noted damper operates at substantially reduced organ pipe resonance, the use of the glass tube embodiment as for example shown in FIG. 7 experiences certain problems. While the damper depicted in FIGS. 6 and 7 operates favorably, it has one particular problem, in that based on the large surface area between tubes, acoustic waves can be reflected by this configuration and hence, the reflected acoustic waves produce undesirable resonances or pressure oscillations, which is not optimal for certain applications. The optimal result is to have a filter which has zero impedance operating in an acoustic channel for replacement of the infinite tube pressure transducers. In the embodiment depicted in FIGS. 6 and 7, the acoustic wave will impinge on the flat surface that exists between the glass tubes. Thus, even if the cylindrical surface contains a large number of holes through which some of the sound waves can pass, the remaining flat surface which basically is provided by the area between the tubes operates as an acoustic reflecting surface.

In FIG. 8, there is shown again a bundle of glass tubes which basically form a cylindrical member 80 which is approximately a quarter of an inch in diameter D and which contains approximately twenty (20) to forty (40) through holes, each of which are about ten (10) mils in diameter. In regard to this configuration, one then utilizes a conically-shaped diamond impregnated coring tool. This coring tool operates to enlarge each hole on the surface on which the acoustic wave will impinge. In one exemplary configuration depicted in FIG. 8, a conical tube has a diameter D1 of 0.100 inches tapering down to D2 of 0.025 inches over a length of 0.150 inches. Each hole is enlarged with the tube and essentially the resulting structure presents zero acoustic impedance. With the input acoustic wave directed towards the conical openings 91 and 92, there is very little area for which the wave to be reflected. Hence, the wave is absorbed and enters each of the conical apertures 91 and 92 and travels down the respective tube 90 which operates to again damp.

Figure 8:
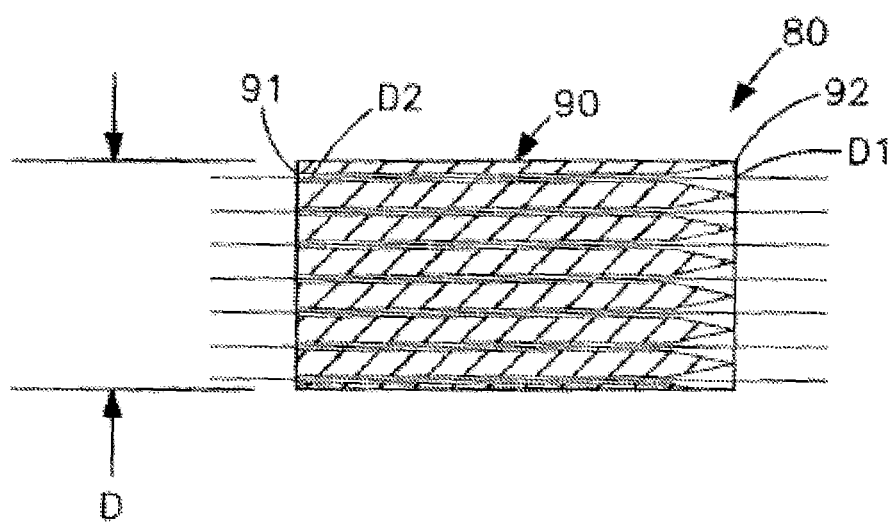
FIG. 8 shows a micro-filter having tapered apertures.

While the embodiment shown in FIGS. 6 and 7 operates, it does not operate as efficiently as the embodiment depicted in FIG. 8. The embodiment depicted in FIG. 8 eliminates resonances due to reflections off the front surface of the damper. For example, in regard to the damper shown in FIGS. 6 and 7 utilizing an overall cylindrical diameter of 0.25 inches and having thirty-one (31) holes in the glass cylindrical member each hole having a diameter of twelve (12) mils, this allows an open area equal to 7.14%. This open area is small and therefore there is a large amount of reflection from the front surface of the damper causing less than optimum performance. In regard to the configuration shown in FIG. 8 utilizing the same number of holes, the initial diameter due to the coring now is thirty-eight (38) mils and reduces to a diameter of twelve (12) mils. This creates a conical hole entrance which basically results in a zero impedance structure. As there is very little surface area for which the acoustic wave to reflect from, the acoustic wave enters the conical apertures and is absorbed within the conical tube. It is noted that the conical apertures taper from a front opening towards the back during a predetermined portion of the tube. This taper can be changed or varied. In any event, as indicated above, the taper extends about 0.15 to 0.25 inches along the length of the tube. Each tube is typically 0.5 to six (6) inches in length. It is of course understood that the length and the diameter of the apertures can vary dependent upon the frequencies to be accommodated. While the use of micro-machined silicon can be employed as the micro-filter, other materials can be used, such as micro-machined glass or micro-machined silicon carbide. Thus, the acoustic filter can be employed and fabricated utilizing many different materials.

Although the various embodiments of the micro-filter presented above, with and without a conical entrance, substantially dampen acoustic waves that interfere with pressure transducer measurements, the micro-filters still exhibit a slight impedance change that results in some reflection of acoustic waves in the tube. These reflections give rise to a low-level acoustic pipe resonance that amplifies and attenuates the pressure measurement made by the transducer. These reflections are undesirable. Hence, the purpose of the exemplary embodiments hereinafter described is to reduce these reflections.

Figure 9:
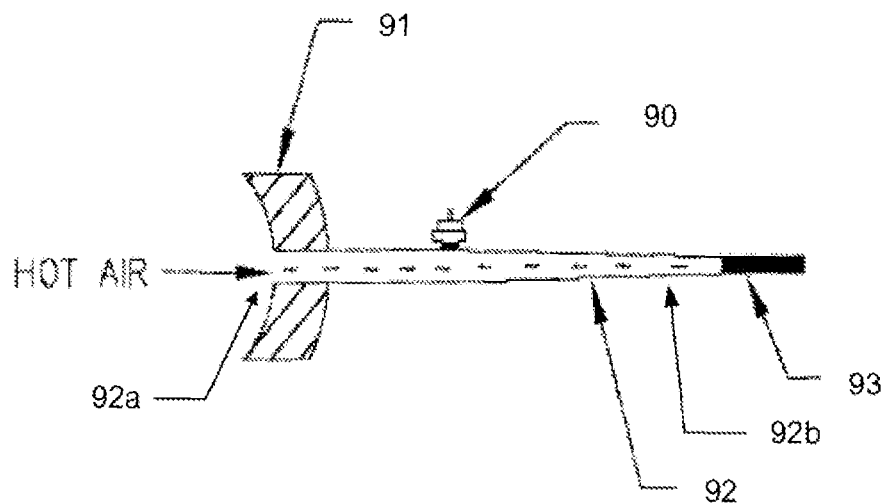
FIG. 9 is an illustration of an exemplary embodiment of the present invention wherein an elongated tube is linearly tapered.
Figure 10:
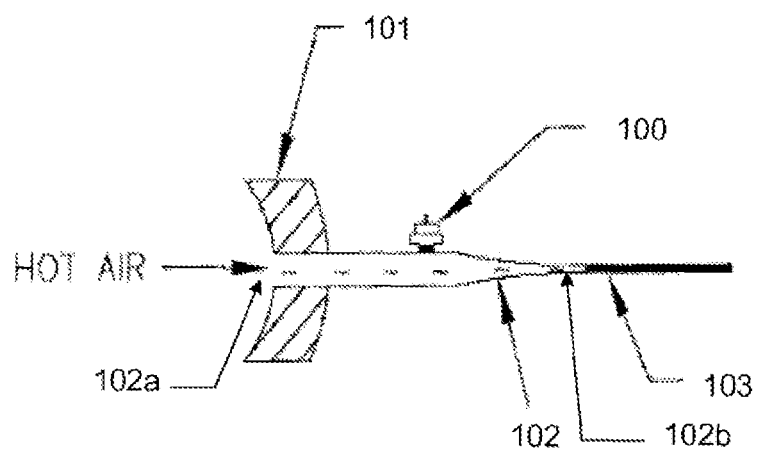
FIG. 10 is an illustration of an exemplary embodiment of the present invention wherein an elongated tube is exponentially tapered.

FIG. 9 is an illustration of an exemplary embodiment of the present invention wherein a tube 92 is elongated and tapered. Lengthening the tube 92 eliminates organ pipe frequencies that arise from the impedance mismatch between the tube 92 and the micro-filter 93. Those skilled in the art will appreciate that lengthening the tube 92 also increases viscous dissipation along the tube 92. Thus, any low magnitude acoustic waves reflected off the entrance of the micro-filter 93 because of the impedance mismatch are attenuated before reaching the pressure transducer 90. Those skilled in the art will appreciate that tapering the elongated tube 92 also improves viscous dissipation. It is important, however, that the decrease in diameter of the tube 92 is gradual such that the tapering does not cause acoustic reflections. In an exemplary embodiment of the present invention, the elongated tube 92 is linearly tapered, as shown in FIG. 9. Alternatively, the elongated tube 102 may be exponentially tapered, as illustrated in FIG. 10. One of ordinary skill in the art will further appreciate that the dimensions of the micro-filter may be adjusted to cooperate with said tapering. Additionally, in another exemplary embodiment, the viscous dissipation of the elongated tube may be further enhanced by increasing the surface roughness of the tube. These exemplary embodiments enable a pressure transducer mounted onto the elongated tube to capture the static and dynamic pressure measurements occurring within the high temperature environment without interference from acoustic waves caused by impedance mismatches between the tube and the micro-filter.

Figure 11:
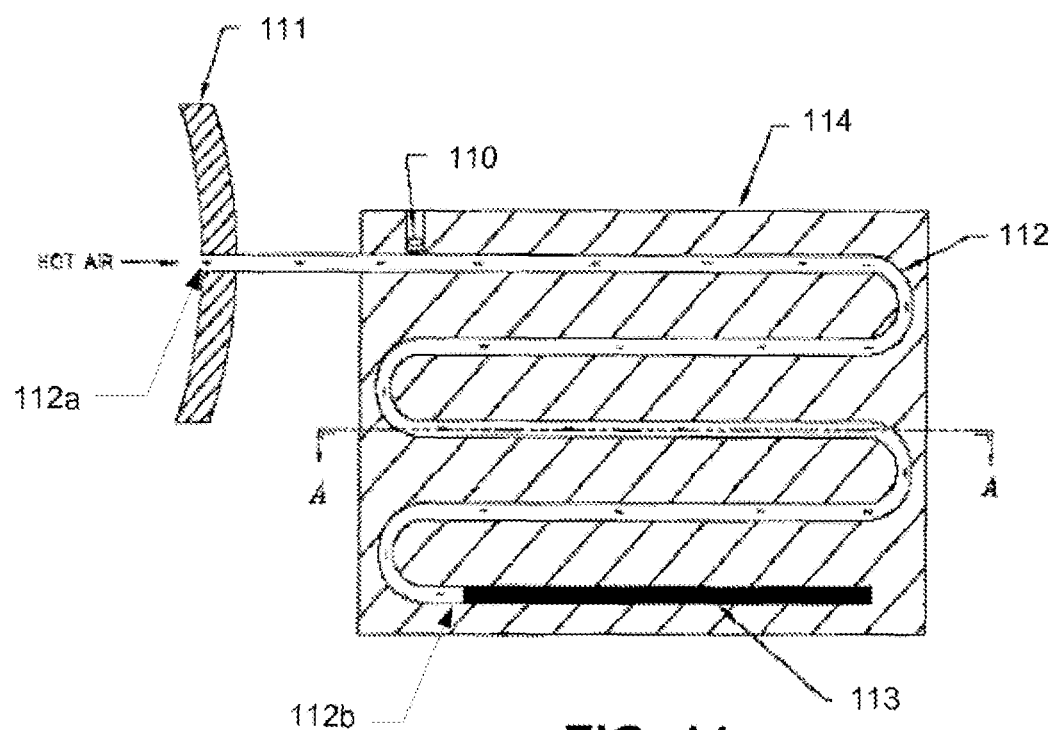
FIG. 11 is an illustration of an exemplary embodiment of the present invention showing an elongated tube machined into a support block, a transducer mounted onto the elongated tube, and a micro-filter disposed at the end of the elongated tube.

FIG. 11 is an illustration of another exemplary embodiment wherein an elongated tube 112 is etched or mechanically machined into a support block 114. The support block 114 is preferably made of metal, glass, or silicon. However, in other embodiments different materials may be used. This elongated tube 112 has a first end 112a and a second end 112b. The first end 112a serves as an input for hot gases emanating from the gas turbine. A micro-filter 113, such as those previously described, is disposed proximate the second end 112b of the elongated tube 112. The micro-filter 113 may be secured to 112 using high temperature cement, epoxy, or some other high temperature adhesive. A pressure transducer 110 is placed on the surface of the tube 112 some distance away from the hot gas inlet 112a, as previously described.

Figure 12:
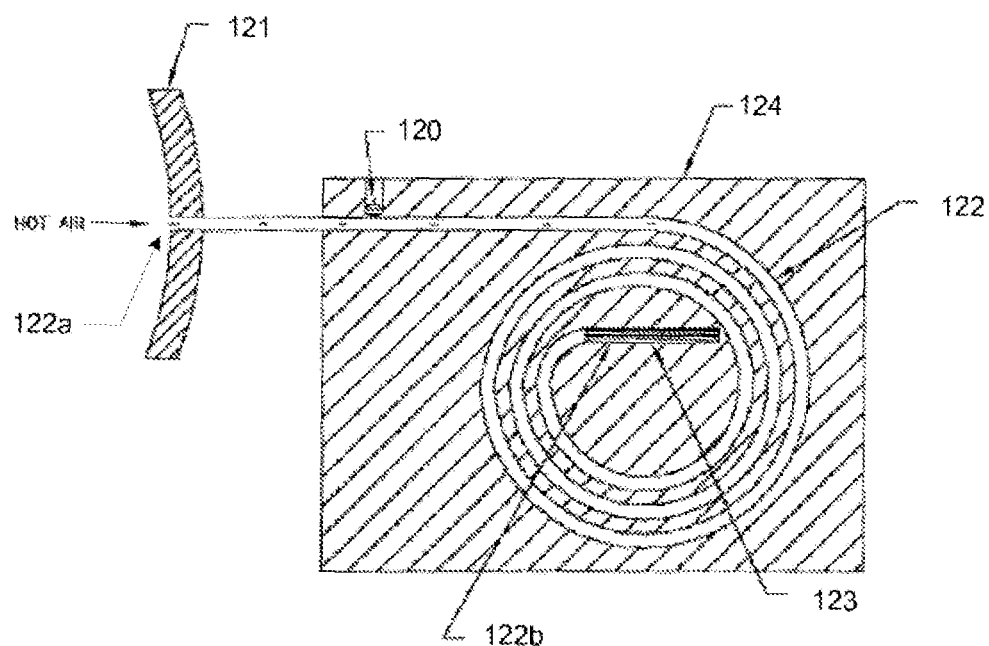
FIG. 12 is an illustration of another exemplary embodiment of the present invention showing an elongated tube machined into a support block, a transducer mounted onto the elongated tube, and a micro-filter disposed at the end of the elongated tube.

The elongated tube 112 may be machined into a support block 114 using a computer numerical controlled (CNC) machine or micro-machined using photolithographic techniques. These techniques also enable the elongated tube 112 to be convoluted into specific patterns. It is preferred that the elongated tube 112 is convoluted as the convolution achieves the desired elongation of the tube, as previously discussed, and enables the support block 114 to be compact, therefore reducing the overall size and mass of the assembly. In a preferred embodiment, the elongated tube 112 is convoluted into a serpentine-shaped pattern, as illustrated in FIG. 11. In another preferred embodiment, the elongated tube 122 is convoluted into a coiled-shape pattern, as illustrated in FIG. 12. However, in other embodiments the elongated tube may be convoluted differently.

Figure 13:
FIG. 13 illustrates preferred cross-sections of the elongated tube.

Those skilled in the art will appreciate that the overall geometry of an elongated tube can also affect acoustic resonances and reflections. Accordingly, FIG. 13 illustrates preferred cross-sections of the elongated tube. In a preferred embodiment of the present invention, the overall geometry of the elongated tube is squared 131, rectangular 132, or oval 134. These preferred embodiments provide the added advantage of reducing acoustic resonances or reflections. In prior embodiments, a transducer, which is cylindrical with a flat face, was mounted perpendicular to the axis of a circular 133 pipe. However, this geometry mismatch causes reflections due to the small cavity that results between the face of the transducer and the circular outer wall of the pipe when the transducer is installed. In the exemplary embodiments wherein the elongated tube is squared 131, rectangular 132, or oval 134, the transducer can be flush mounted to the side of the tube without a geometry mismatch, thereby improving the frequency response of the device. These additional embodiments enable high frequency measurements in high temperature environments without acoustic wave reflections.

Figure 14:
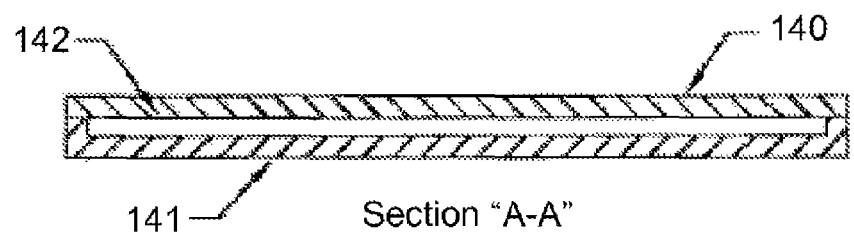
FIG. 14 is a cross-sectional view illustration of an elongated tube machined into a support block wherein a cover is disposed on the top surface of the support block.

In another embodiment, the elongated tube, micro-filter, and pressure transducer may be covered by mounting or bonding a cover onto the support block. FIG. 14 is a cross-sectional view illustration of an elongated tube 142 machined into a support block 141 wherein a cover 140 is disposed on the top surface of the support block. This cover 140 is preferably made of metal; however, it may also be made of glass, silicon, quartz, or silicon carbide. However other materials for the cover may be used in different embodiments.

Figure 15:
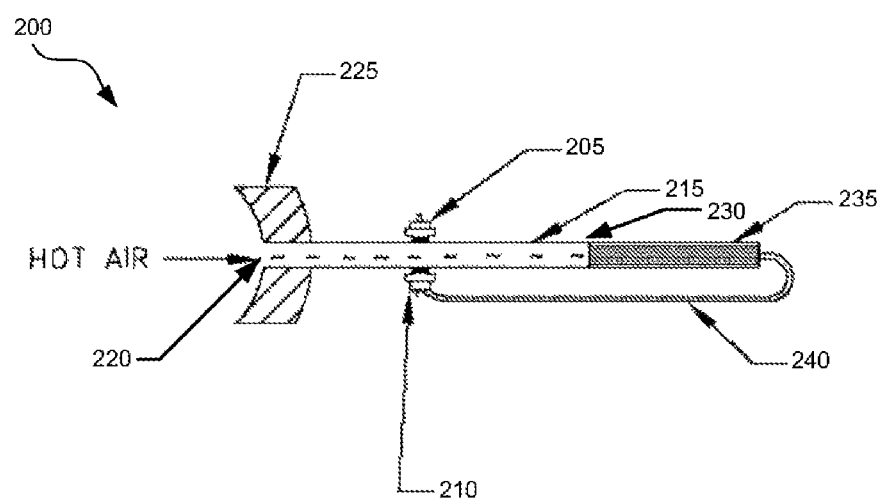
FIG. 15 illustrates an exemplary embodiment of the present invention showing a transducer assembly comprising a static-dynamic transducer and a micro-filter.

FIG. 15 illustrates another exemplary embodiment, wherein a transducer assembly 200 employs both high temperature capabilities of micro-filters and pressure sensitivity characteristics of static-dynamic transducers to create a compact system that utilizes static pressure compensation to capture low-level dynamic pressures. These low-level dynamic pressures range from about a fraction of a pound per square inch (PSI) to several PSI and are superimposed on top of large, relatively constant pressures of several hundred psi, therefore making them difficult to capture and measure.

The transducer assembly 200 comprises two sensors, a total pressure or quasi-static pressure sensor 205 and a dynamic pressure sensor 210, and a first elongated tube 215. Both sensors comprise deflecting diaphragms adapted to deflect upon an applied pressure. More specifically, the total pressure sensor 205 is adapted to measure the total pressure of an incoming pressure source and the dynamic pressure sensor 210 is adapted to measure low-level dynamic pressure of an incoming pressure source. The first elongated tube 215 has a first end 220, which extends from a gas turbine engine casing 225, and a second end 230. The first end 220 of the first elongated tube 215 receives an incoming pressure emanating from a pressure source, for example, a gas turbine engine.

Like other exemplary embodiments described herein, the total pressure sensor 205 and the dynamic pressure sensor 210 are flush-mounted onto the first elongated tube 215 and extend through to the inner wall of the first elongated tube 215. More specifically, the total pressure sensor 205 and the dynamic pressure sensor 210 are placed between the first end 220 and the second end 230 of the first elongated tube 215 and are equidistant from the first end 220 of the first elongated tube 215.

The transducer assembly further comprises a micro-filter 235. The micro-filter 235 is disposed proximate the second end 230 of the first elongated tube 215. As in other exemplary embodiments described above, the micro-filter 235 is adapted to dampen acoustic level pressure waves from the incoming pressure source using viscous dissipation, such that the acoustic waves are almost eliminated as they approach a terminal end of the micro-filter 235.

The transducer assembly 200 further comprises a second elongated tube 240 disposed proximate the terminal end of the micro-filter 235. The second elongated tube 240 is adapted to eliminate remaining acoustic level pressure waves and extends between the terminal end of the micro-filter 235 and a bottom side of the dynamic sensor 210. The second elongated tube 240 is of a length and a diameter such that only large static pressures reach the bottom side of the dynamic sensor 210. One skilled in the art will appreciate that the cut-off frequency of the dynamic sensor 210 may be tailored by adjusting the length and diameter of the second elongated tube 240. As an example, the diameter of the second elongated tube 240 can range from about one mil to thirty (30) mils and the length of the second elongated tube 230 can range from about a fraction of an inch to twelve (12) inches or longer depending on the space constraints and desired level of damping.

In this exemplary embodiment, the total pressure sensor 205 measures the total pressure of the incoming pressure source, whereas the dynamic pressure sensor 210 measures low-level dynamic pressure of the incoming pressure source using static pressure compensation techniques. Specifically, the top side of the dynamic pressure sensor's 210 deflecting diaphragm receives both static and dynamic pressure from the incoming pressure source and the bottom side of the dynamic pressure sensor's 210 deflecting diaphragm receives only static pressure, due to the dampening that occurs in the micro-filter 235 and second elongated tube 240, described above. Static pressure is thus canceled out by the counter-acting deflection, leaving only low-level dynamic pressure for the dynamic sensor 210 to measure. This transducer assembly 200 is thus desirable for use in extreme temperature applications (700° C.-2,000° C.), where low-level dynamic pressure measurements are required, because it accurately measures low-level dynamic pressures using static pressure compensation techniques.

The transducer assembly 200 may also comprise a dynamic calibration system adapted to mathematically process out low-level, built-in resonance. Although the micro-filter 235 effectively dissipates acoustic level pressure waves within the first elongated tube 215, minor reflections off the front of the micro-filter 235 can occur due to impedance changes. These reflections may lead to low-level resonances within the system having a frequency of about one kilohertz (1 kHz) to about three kilohertz (3 kHz), which can interfere with the accuracy of the static 205 and dynamic 210 pressure sensors. The dynamic calibration system measures and characterizes these low-level resonances and eliminates them using a deconvolution technique. Deconvolution is a mathematical technique that can be applied to the dynamic pressure results to cancel out system resonance. The deconvolution technique operates by dividing the measured signal, from both sensors, by the known spectral characteristics of the micro-filter 235 in the Fourier or frequency domain. This technique can be carried out using either a microprocessor that is directly built into the transducer assembly 200 or a real-time or post-processing data acquisition system.

This deconvolution technique computationally reverses signal distortion created by small reflections at the front of the micro-filter 225 such that the output from the transducer assembly 200 is a near flat response from DC to about five kilohertz (5 kHz) to about thirty kilohertz (30 kHz). This data processing technique is well within the processing power of both stand alone computers and/or advanced microprocessors, therefore making it possible to obtain real-time pressure information from gas turbine engine areas that were previously immeasurable. Combined with the improved accuracy of low-level dynamic pressure measurements, this data allows for better control and/or monitoring of gas turbine engines.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:
1. A method, comprising:
receiving, at a first tube, a pressure, wherein the pressure includes a static pressure component and a dynamic pressure component;
receiving, at a micro-filter, the pressure;
filtering, by the micro-filter, at least a portion of the dynamic pressure component of the pressure;
outputting, from the micro-filter, a filtered pressure;
receiving, at a first surface of a first sensing element, the pressure;

receiving, at a second surface of the first sensing element, the filtered pressure;

measuring, by the first sensing element, a difference between the pressure and the filtered pressure, wherein the difference is associated with the dynamic pressure component of the pressure; and outputting, from the first sensing element, a first pressure signal associated with the dynamic pressure component of the pressure.

2. The method of claim 1, further comprising:

receiving, at a second sensing element, the pressure;

measuring, by the second sensing element, the pressure; and outputting, from the second sensing element, a second pressure signal associated with the pressure.

3. The method of claim 2, wherein the first pressure signal and the second pressure signal are used to determine the static pressure component of the pressure.

4. The method of claim 2, wherein the pressure received at a front end of the first tube has a first temperature, the pressure received at the first surface of the first sensing element has a second temperature and the pressure received at the second sensing element has a third temperature; and wherein the first temperature is greater than the second temperature and the third temperature and the second temperature and the third temperature are approximately equal.

5. The method of claim 4, wherein the first temperature is in a range from about seven hundred degrees Celsius (700° C.) to about two thousand degrees Celsius (2,000° C.).

6. The method of claim 1, wherein the first sensing element is mounted to the first tube.

7. The method of claim 2, wherein each of the first sensing element and the second sensing element is mounted to the first tube about equidistant from a front end of the first tube.

8. The method of claim 1, further comprising:

receiving, by a second tube, the filtered pressure; and filtering, by the second tube, at least a portion of the dynamic pressure component of the filtered pressure.

9. The method of claim 8, wherein the second tube has a diameter and a length sufficient to achieve a predetermined dampening frequency.

10. The method of claim 1, wherein the micro-filter has an array of apertures.

11. A system, comprising:

a first tube having a front end and a back end, wherein the first tube is configured to:

receive, at the front end of the first tube, a pressure, wherein the pressure includes a static pressure component and a dynamic pressure component;

a micro-filter disposed proximate the back end of the first tube, wherein the micro-filter is configured to:

receive the pressure;

filter at least a portion of the dynamic pressure component of the pressure; and output a filtered pressure; and a first sensing element operationally coupled to the first tube and the micro-filter and having a first surface and a second surface, wherein the first sensing element is configured to:

receive, at the first surface of the first sensing element, the pressure;

receive, at the second surface of the first sensing element, the filtered pressure;

measure a difference between the pressure and the filtered pressure, wherein the difference is associated with the dynamic pressure component of the pressure; and output a first pressure signal associated with the dynamic pressure component of the pressure.

12. The system of claim 11, further comprising:

a second sensing element operationally coupled to the first tube, wherein the second sensing element is configured to:

receive the pressure;

measure the pressure; and output a second pressure signal associated with the pressure.

13. The system of claim 12, wherein the first pressure signal and the second pressure signal are used to determine the static pressure component of the pressure.

14. The system of claim 12, wherein the pressure received at the front end of the first tube has a first temperature, the pressure received at the first surface of the first sensing element has a second temperature and the pressure received at the second sensing element has a third temperature; and wherein the first temperature is greater than the second temperature and the third temperature, and the second temperature and the third temperature are approximately equal.

15. The system of claim 14, wherein the first temperature is in a range from about seven hundred degrees Celsius (700° C.) to about two thousand degrees Celsius (2,000° C.).

16. The system of claim 11, wherein the first sensing element is mounted to the first tube.

17. The system of claim 12, wherein each of the first sensing element and the second sensing element is mounted to the first tube about equidistant from the front end of the first tube.

18. The system of claim 11, further comprising:

a second tube operationally coupled to the micro-filter and the first sensing element, wherein the second tube is configured to:

receive the filtered pressure; and filter at least a portion of the dynamic pressure component of the filtered pressure.

19. The system of claim 18, wherein the second tube has a diameter and a length sufficient to achieve a predetermined dampening frequency.

20. The system of claim 11, wherein the micro-filter has an array of apertures.

* * * * *